(12) United States Patent
Iguchi et al.

(10) Patent No.: US 10,930,976 B2
(45) Date of Patent: Feb. 23, 2021

(54) ELECTROLYTE SOLUTION AND LITHIUM ION BATTERY

(71) Applicant: TOYOTA JIDOSHA KABUSHIKI KAISHA, Toyota (JP)

(72) Inventors: Hiroki Iguchi, Nagoya (JP); Hideki Sano, Ikeda (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 51 days.

(21) Appl. No.: 16/294,334

(22) Filed: Mar. 6, 2019

(65) Prior Publication Data
US 2019/0288341 A1 Sep. 19, 2019

(30) Foreign Application Priority Data
Mar. 16, 2018 (JP) .................. 2018-049152

(51) Int. Cl.
*H01M 10/0569* (2010.01)
*H01M 10/0525* (2010.01)

(52) U.S. Cl.
CPC ... *H01M 10/0569* (2013.01); *H01M 10/0525* (2013.01); *H01M 2300/0028* (2013.01)

(58) Field of Classification Search
None
See application file for complete search history.

(56) References Cited

FOREIGN PATENT DOCUMENTS

| JP | 4-162370 A | 6/1992 |
| JP | 2013-229216 A | 11/2013 |
| JP | 2015079636 A * | 4/2015 |
| WO | WO-2011003959 A1 * | 1/2011 .......... H01M 10/052 |

* cited by examiner

*Primary Examiner* — Sarah A. Slifka
*Assistant Examiner* — Patrick Marshall Greene
(74) *Attorney, Agent, or Firm* — Sughrue Mion, PLLC

(57) ABSTRACT

An electrolyte solution is used for a lithium ion battery. The electrolyte solution contains at least a solvent and lithium salt. The solvent contains at least methoxymethyl formate.

13 Claims, 3 Drawing Sheets

ELECTROLYTE SOLUTION AND LITHIUM ION BATTERY

This nonprovisional application is based on Japanese Patent Application No. 2018-049152 filed with the Japan Patent Office on Mar. 16, 2018, the entire contents of which are hereby incorporated by reference.

BACKGROUND

Field

The present disclosure relates to an electrolyte solution and a lithium ion battery.

Description of the Background Art

Japanese Patent Laying-Open No. 2013-229216 discloses an electrolyte solution containing a mixed solvent of cyclic carbonate and chain carbonate as a solvent.

SUMMARY

A conductivity of an electrolyte solution is considered to be dependent on the number of lithium (Li) ions in a liquid and mobility of Li ions. Therefore, a solvent for an electrolyte solution is required to be high in dissociative capacity and low in viscosity. With high dissociative capacity of the solvent, promotion of dissociation of Li salt and increase in number of lithium ions are expected. With low viscosity of the solvent, mobility of Li ions is expected.

Cyclic carbonate and chain carbonate have conventionally commonly been used for an electrolyte solution for a lithium ion battery. Though cyclic carbonate is high in dissociative capacity, it is high in viscosity. Though chain carbonate is low in viscosity, it is low in dissociative capacity. Therefore, dissociative capacity and viscosity have been balanced by mixing cyclic carbonate and chain carbonate.

An object of the present disclosure is to provide a novel electrolyte solution for a lithium ion battery.

Technical features and functions and effects of the present disclosure will be described below. A functional mechanism of the present disclosure, however, includes presumption. The scope of claims should not be limited by whether or not the functional mechanism is correct.

[1] An electrolyte solution in the present disclosure is used for a lithium ion battery. The electrolyte solution contains at least a solvent and lithium salt. The solvent contains at least methoxymethyl formate.

It is considered that an electrolyte solution containing methoxymethyl formate (MMF) has not conventionally been known. Namely, the electrolyte solution in the present disclosure is considered as a novel electrolyte solution.

According to new findings in the present disclosure, MMF alone is considered as being excellent in balance between dissociative capacity and viscosity. Enhancement of a degree of freedom in designing a composition of a solvent is expected by containing MMF in the solvent. Then, it is expected that an electrolyte solution high in conductivity is provided.

[2] The solvent may contain at least 60 vol % of methoxymethyl formate.

[3] The solvent may contain at least 80 vol % of methoxymethyl formate.

The electrolyte solution in the present disclosure is expected to achieve an improved conductivity with a higher ratio of MMF, because MMF alone is considered as being excellent in balance between dissociative capacity and viscosity.

[4] A lithium ion battery in the present disclosure contains at least the electrolyte solution described in any one of [1] to [3] above.

The lithium ion battery in the present disclosure is expected to exhibit high output because the electrolyte solution can be high in conductivity.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
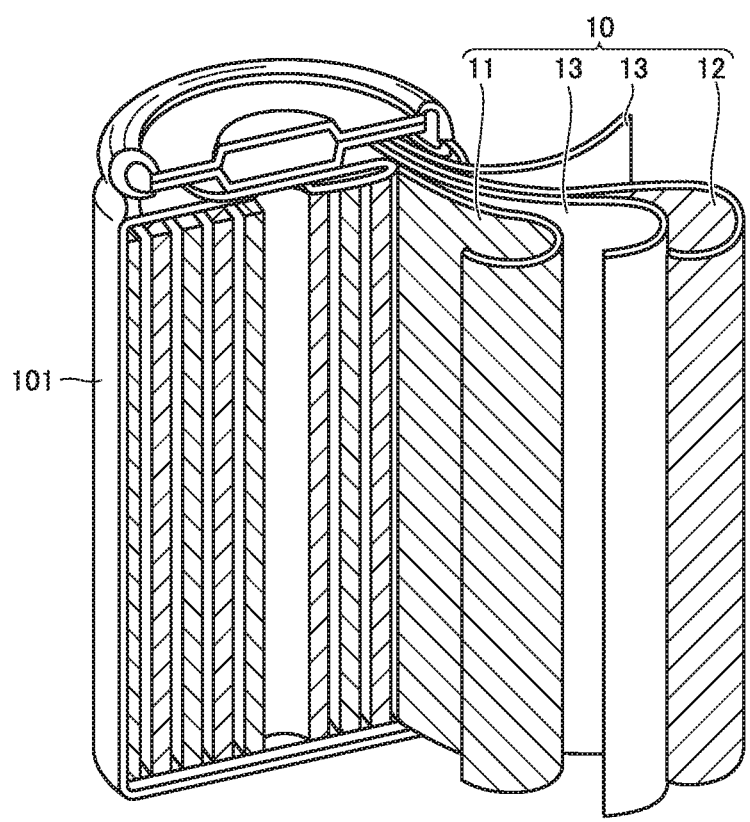
FIG. 1 is a schematic diagram showing one example of a construction of a lithium ion battery in the present embodiment.

An embodiment of the present disclosure (which is herein also denoted as the "present embodiment") will be described below. The description below, however, does not limit the scope of claims.

<Electrolyte Solution>

An electrolyte solution in the present embodiment is used for a lithium ion battery. Details of the lithium ion battery will be described later. The electrolyte solution contains at least a solvent and lithium (Li) salt.

The electrolyte solution in the present embodiment is expected to be high in conductivity. The electrolyte solution may have a conductivity, for example, not less than 11.3 mS/cm. The electrolyte solution may have a conductivity, for example, not less than 11.8 mS/cm. The electrolyte solution may have a conductivity, for example, not less than 13.1 mS/cm. The electrolyte solution may have a conductivity, for example, not less than 13.9 mS/cm. The electrolyte solution may have a conductivity, for example, not less than 14.7 mS/cm. The electrolyte solution may have a conductivity, for example, not less than 15.6 mS/cm. The electrolyte solution may have a conductivity, for example, not less than 16.8 mS/cm. The upper limit of the conductivity should not particularly be set. The electrolyte solution may have a conductivity, for example, not higher than 17.5 mS/cm.

A conductivity in the present embodiment is expressed as a measurement value obtained at 25° C. A conductivity is measured with a general conductivity meter. The conductivity meter is also referred to as an electrical conductivity meter or an electroconductivity meter. A conductivity is measured at least three times. An arithmetic mean of at least three times of measurement is adopted.

<<Solvent>>

A solvent is a liquid component in which Li salt is dissolved. The solvent is aprotic. The solvent in the present embodiment contains at least methoxymethyl formate (MMF). A structural formula of MMF is shown in Table 1 below.

TABLE 1

| | EC | DMC | MMF |
|---|---|---|---|
| Structural Formula | (EC structure) | $_3HC\diagdown_O\diagup\underset{O}{\overset{O}{\|}}\diagdown_O\diagdown CH_3$ | (MMF structure) |
| Molecular Weight | 88 | 90 | 90 |
| Viscosity (25° C.) [mPa·s] | Solid | 0.65 | 0.86 |

MMF alone is considered as being excellent in balance between dissociative capacity and viscosity. Enhancement of a degree of freedom in designing a composition of the solvent is expected by containing MMF in the solvent. In addition, it is expected that an electrolyte solution high in conductivity is provided.

Table 1 also shows ethylene carbonate (EC) and dimethyl carbonate (DMC). MMF, EC, and DMC are substantially comparable in molecular weight. EC represents a typical example of cyclic carbonate. EC is high in dissociative capacity. EC, however, is solid at 25° C. (that is, high in viscosity). DMC represents a typical example of chain carbonate. Though DMC is low in viscosity, it is low in dissociative capacity.

MMF is substantially comparable to DMC in viscosity at 25° C. Namely, MMF is low in viscosity. Furthermore, MMF is considered as being considerably high in dissociative capacity. Namely, MMF alone is considered as being excellent in balance between dissociative capacity and viscosity.

The solvent may contain, for example, at least 1 vol % and at most 100 vol % (at least 1 volume % and at most 100 volume %) of MMF. The solvent may contain, for example, at least 10 vol % and at most 100 vol % of MMF. The solvent may contain, for example, at least 40 vol % and at most 100 vol % of MMF.

A composition of the solvent can be identified by a conventionally known method. The composition of the solvent can be analyzed, for example, by nuclear magnetic resonance (NMR) or gas chromatograph mass spectrometry (GC-MS). The composition of the solvent is analyzed at least three times. An arithmetic mean of at least three times of analysis is adopted.

In the present embodiment, a higher conductivity is expected as a ratio of MMF in the solvent is higher. The solvent may contain, for example, at least 60 vol % of MMF. The solvent may contain, for example, at least 80 vol % of MMF. The solvent may consist substantially of MMF alone. Namely, the solvent may contain 100 vol % of MMF.

So long as the solvent contains MMF, the solvent may further contain other components. Examples of other components include cyclic carbonate, chain carbonate, lactone, cyclic ether, chain ether, and carboxylate. The solvent may contain one type of other component alone. The solvent may contain at least two types of other components.

Cyclic carbonate may be, for example, EC, propylene carbonate (PC), butylene carbonate (BC), or fluoroethylene carbonate (FEC). Chain carbonate may be, for example, DMC, ethyl methyl carbonate (EMC), or diethyl carbonate (DEC).

Lactone may be, for example, γ-butyrolactone (GBL) or δ-valerolactone. Cyclic ether may be, for example, tetrahydrofuran (THF), 1,3-dioxolane, or 1,4-dioxane. Chain ether may be, for example, 1,2-dimethoxyethane (DME). Carboxylate may be, for example, methyl formate (MF), methyl acetate (MA), or methyl propionate (MP).

The solvent may contain, for example, at least 40 vol % and less than 100 vol % of MMF and cyclic carbonate (for example, EC) as a remainder. The solvent may contain, for example, at least 60 vol % and less than 100 vol % of MMF and cyclic carbonate as a remainder. The solvent may contain, for example, at least 80 vol % and less than 100 vol % of MMF and cyclic carbonate as a remainder.

The solvent may contain, for example, at least 40 vol % and less than 100 vol % of MMF and chain carbonate (for example, DMC) as a remainder. The solvent may contain, for example, at least 60 vol % and less than 100 vol % of MMF and chain carbonate as a remainder. The solvent may contain, for example, at least 80 vol % and less than 100 vol % of MMF and chain carbonate as a remainder.

The solvent may contain, for example:
at least 40 vol % and less than 100 vol % of MMF; and
a remainder consisting of cyclic carbonate (for example, EC) and chain carbonate (for example, DMC).
The solvent may contain, for example:
at least 60 vol % and less than 100 vol % of MMF; and
a remainder consisting of cyclic carbonate and chain carbonate.
The solvent may contain, for example:
at least 80 vol % and less than 100 vol % of MMF; and
a remainder consisting of cyclic carbonate and chain carbonate.

Cyclic carbonate and chain carbonate contained as a remainder may satisfy relation, for example, of "cyclic carbonate:chain carbonate=10:90 to 90:10 (at a volume ratio)." Cyclic carbonate and chain carbonate may satisfy relation, for example, of "cyclic carbonate:chain carbonate=20:80 to 80:20 (at a volume ratio)." Cyclic carbonate and chain carbonate may satisfy relation, for example, of "cyclic carbonate:chain carbonate=30:70 to 70:30 (at a volume ratio)."

<<Lithium Salt>>

Li salt is a supporting electrolyte. Li salt is dissolved in a solvent. A concentration of Li salt (which is also denoted as a "salt concentration" below) may be, for example, not lower than 0.5 mol/L and not higher than 2 mol/L (not lower than 0.5 M and not higher than 2 M). The salt concentration can be measured by a conventionally known method. The salt concentration can be measured, for example, by NMR.

It is considered that the absolute number of Li ions which can be produced by dissociation of Li salt is increased as a salt concentration is higher. A degree of dissociation of Li salt, however, is considered to lower as the salt concentration is higher. Therefore, it is considered that there is an optimal value for the salt concentration at which the number of Li ions contributing to ion conduction (the number of effective Li ions) is maximized. Since dissociative capacity is different for each solvent, an optimal value for the salt concentration is considered to be different for each solvent. Approximately 1 mol/L has been defined as an optimal value for the salt concentration in the conventional solvent (for example, "EC:DMC=30:70 (at a volume ratio)"). Since the electrolyte solution in the present embodiment is high in dissociative capacity, an optimal value for the salt concentration may be in a range exceeding 1 mol/L. In the present embodiment, the salt concentration may be, for example, not lower than 1.1 mol/L and not higher than 1.5 mol/L.

A type of Li salt can also be identified by a conventionally known method. A type of Li salt can be identified, for example, by NMR. Li salt may be, for example, $LiPF_6$, $LiBF_4$, $LiClO_4$, $LiAsF_6$, $LiSbF_6$, $LiCF_3SO_3$, $LiC_4F_9SO_3$, $Li[N(FSO_2)_2]$, $Li[N(CF_3SO_2)_2]$, or $Li[C(CF_3SO_2)_3]$. One type of Li salt alone may be contained in the electrolyte solution. At least two types of Li salt may be contained in the electrolyte solution. When at least two types of Li salt are contained in the electrolyte solution, the salt concentration represents a total concentration of all types of Li salt.

<<Additive>>

The electrolyte solution may further contain various additives so long as it contains the solvent and Li salt. A concentration of an additive may be, for example, not lower than 0.005 mol/L and not higher than 0.5 mol/L. Examples of the additive include a solid electrolyte interface (SEI) film forming agent, a gas generating agent, and a flame retardant. One type of additive alone may be contained in the electrolyte solution. At least two types of additives may be contained in the electrolyte solution. When the electrolyte solution contains at least two types of additives, a concentration of the additives represents a total concentration of all additives.

The SEI film forming agent is, for example, a component which promotes formation of an SEI at a surface of a negative electrode active material or the like. The SEI film forming agent may be, for example, vinylene carbonate (VC), vinyl ethylene carbonate (VEC), $LiB(C_2O_4)_2$, $LiBF_2(C_2O_4)$, $LiPF_2(C_2O_4)_2$, propane sultone (PS), or ethylene sulfite (ES).

The gas generating agent is also referred to as an overcharge additive. The gas generating agent is a component which can generate gas when overcharged and promote activation, for example, of a current interrupt device (CID) to be activated by a pressure. The gas generating agent may be, for example, cyclohexylbenzene (CHB) or biphenyl (BP).

The flame retardant is a component which provides flame retardancy to the electrolyte solution. The flame retardant may be, for example, phosphate or a phosphazene compound.

<Lithium Ion Battery>

A lithium ion battery in the present embodiment will be described below. The lithium ion battery in the present embodiment may be a secondary battery. The lithium ion battery in the present embodiment may be a primary battery. The lithium ion battery may be abbreviated as a "battery" below.

FIG. 1 is a schematic diagram showing one example of a construction of a lithium ion battery in the present embodiment.

A battery 100 is a lithium ion battery. Battery 100 includes a case 101. Case 101 is cylindrical. Case 101 may be prismatic. Case 101 can be formed, for example, of stainless steel or an aluminum (Al) alloy. Case 101 may be a pouch made of an aluminum laminated film. Case 101 may include, for example, a gas exhaust valve and a CID.

Case 101 accommodates an electrode array 10 and an electrolyte solution (not shown). The electrolyte solution in the present embodiment is adopted as the electrolyte solution. Namely, battery 100 contains at least the electrolyte solution in the present embodiment. Details of the electrolyte solution in the present embodiment are as described previously. Battery 100 is expected to be high in output because it is considered that the electrolyte solution in the present embodiment can be high in conductivity.

Battery 100 may contain a gel electrolyte. Battery 100 may be what is called a lithium ion polymer battery. The gel electrolyte can be formed by impregnation and swelling of a polymer material with the electrolyte solution. Improvement in output is expected as a result of adoption of the electrolyte solution in the present embodiment as the electrolyte solution to be contained in the gel electrolyte. The polymer material contained in the gel electrolyte may be, for example, polyvinylidene difluoride (PVdF) or a polyvinylidene difluoride-hexafluoropropylene copolymer (PVdF-HFP).

Electrode array 10 includes a positive electrode 11, a negative electrode 12, and a separator 13. Electrode array 10 is of a wound type. Electrode array 10 is formed by stacking positive electrode 11, separator 13, negative electrode 12, and separator 13 in this order and further spirally winding the same.

Electrode array 10 may be of a stack (layered) type. Electrode array 10 may be formed by alternately stacking at least one positive electrode 11 and at least one negative electrode 12. Separator 13 is arranged between positive electrode 11 and negative electrode 12.

<<Positive Electrode>>

Positive electrode 11 may be, for example, in a form of a sheet. Positive electrode 11 contains at least a positive electrode active material. Positive electrode 11 may further include, for example, a positive electrode current collector, a conductive material, and a binder. Positive electrode 11 can be formed, for example, by applying a positive electrode composite material containing a positive electrode active material, a conductive material, and a binder to a surface of a positive electrode current collector. The positive electrode current collector may be, for example, an Al foil. The positive electrode current collector may have a thickness, for example, not smaller than 5 μm and not greater than 50 μm.

The positive electrode active material is composed typically of a group of particles. The positive electrode active material may have d50, for example, not smaller than 1 μm and not greater than 30 μm. d50 refers to a particle size at which a cumulative volume of particles from a finer side attains to 50% of the total volume of particles in a particle size distribution obtained by a laser diffraction/scattering method.

The positive electrode active material occludes and releases Li ions. The positive electrode active material should not particularly be limited. The positive electrode active material may be, for example, lithium cobalt oxide ($LiCoO_2$), nickel lithium oxide ($LiNiO_2$), lithium manganese oxide (for example, $LiMnO_2$ or $LiMn_2O_4$), lithium nickel cobalt manganese oxide (for example, $LiNi_{1/3}Co_{1/3}Mn_{1/3}O_2$), lithium nickel cobalt aluminum oxide (for example, $LiNi_{0.82}Co_{0.15}Al_{0.03}O_2$), or lithium iron phosphate ($LiFePO_4$). One type of positive electrode active material alone may be contained in positive electrode 11. At least two types of positive electrode active materials may be contained in positive electrode 11.

The conductive material is electron-conductive. The conductive material should not particularly be limited either. For example, carbon black (for example, acetylene black) or short carbon fiber may be adopted as the conductive material. A content of the conductive material may be, for example, not less than 0.1 part by mass and not more than 10 parts by mass with respect to 100 parts by mass of positive electrode active material.

The binder binds the positive electrode active materials (particles) to each other. The binder binds the positive electrode active material and the positive electrode current collector to each other. The binder should not particularly be limited either. The binder may be composed, for example, of PVdF. A content of the binder may be, for example, not less than 0.1 part by mass and not more than 10 parts by mass with respect to 100 parts by mass of positive electrode active material.

<<Negative Electrode>>

Negative electrode 12 may be, for example, in a form of a sheet. Negative electrode 12 contains at least a negative electrode active material. Negative electrode 12 may further include, for example, a negative electrode current collector and a binder. Negative electrode 12 can be formed, for example, by applying a negative electrode composite material containing a negative electrode active material and a binder to a surface of a negative electrode current collector. The negative electrode current collector may be, for example, a copper (Cu) foil. The negative electrode current collector may have a thickness, for example, not smaller than 5 μm and not greater than 50 μm.

The negative electrode active material is composed typically of a group of particles. The negative electrode active material may have d50, for example, not smaller than 1 μm and not greater than 30 μm. The negative electrode active material occludes and releases Li ions. The negative electrode active material should not particularly be limited. The negative electrode active material may be, for example, graphite, soft carbon, hard carbon, silicon, silicon oxide, a silicon-based alloy, tin, tin oxide, a tin-based alloy, lithium (a pure metal), a lithium alloy (for example, an Li—Al alloy), or lithium titanate. One type of negative electrode active material alone may be contained in negative electrode 12. At least two types of negative electrode active materials may be contained in negative electrode 12.

The binder binds the negative electrode active materials (particles) to each other. The binder binds the negative electrode active material and the negative electrode current collector to each other. The binder should not particularly be limited either. The binder may be, for example, carboxymethyl cellulose (CMC) and styrene-butadiene rubber (SBR). A content of the binder may be, for example, not less than 0.1 part by mass and not more than 10 parts by mass with respect to 100 parts by mass of negative electrode active material.

<<Separator>>

Separator 13 is electrically insulating. Separator 13 is arranged between positive electrode 11 and negative electrode 12. Positive electrode 11 and negative electrode 12 are separated from each other by separator 13. Separator 13 is formed of a porous film. Separator 13 allows passage of the electrolyte solution therethrough. Separator 13 may have a thickness, for example, not smaller than 10 μm and not greater than 30 μm. Separator 13 may be formed of a porous film, for example, composed of polyolefin.

Separator 13 may have a single-layered structure. Separator 13 may be formed, for example, only of a porous film composed of polyethylene (PE). Separator 13 may have a multi-layered structure. Separator 13 may be formed, for example, by stacking a porous film composed of polypropylene (PP), a porous film composed of PE, and a porous film composed of PP in this order. Separator 13 may include a heat-resistant film on a surface thereof. The heat-resistant film contains a heat-resistant material. The heat-resistant material may be, for example, boehmite, silica, or titania.

EXAMPLES

Examples of the present disclosure will be described below. The description below does not limit the scope of claims.

<Preparation of Electrolyte Solution and Measurement of Conductivity>

Each electrolyte solution shown in Table 2 below was prepared. A conductivity of each electrolyte solution was measured. A conductivity was measured at 25° C.

TABLE 2

| | Electrolyte Solution | | Conductivity (25° C.) |
|---|---|---|---|
| | Solvent | Li Salt | [mS/cm] |
| Comparative Example 1 | EC (100 vol %) | LiPF$_6$ (1.1 mol/L) | 8.0 |
| Comparative Example 2 | DMC (100 vol %) | LiPF$_6$ (1.1 mol/L) | 7.5 |
| Comparative Example 3 | DMC (70 vol %) + EC (30 vol %) | LiPF$_6$ (1.1 mol/L) | 12.3 |
| Example 1 | MMF (100 vol %) | LiPF$_6$ (1.1 mol/L) | 16.8 |
| Example 2 | MMF (100 vol %) | LiPF$_6$ (1.5 mol/L) | 17.5 |
| Example 3 | MMF (80 vol %) + EC (20 vol %) | LiPF$_6$ (1.1 mol/L) | 15.6 |
| Example 4 | MMF (60 vol %) + EC (40 vol %) | LiPF$_6$ (1.1 mol/L) | 13.9 |
| Example 5 | MMF (40 vol %) + EC (60 vol %) | LiPF$_6$ (1.1 mol/L) | 11.8 |
| Example 6 | MMF (80 vol %) + DMC (20 vol %) | LiPF$_6$ (1.1 mol/L) | 14.7 |
| Example 7 | MMF (60 vol %) + DMC (40 vol %) | LiPF$_6$ (1.1 mol/L) | 13.1 |
| Example 8 | MMF (40 vol %) + DMC (60 vol %) | LiPF$_6$ (1.1 mol/L) | 11.3 |

<Results>

In Comparative Example 1, a solvent consisting of cyclic carbonate (EC) alone was used. Comparative Example 1 was low in conductivity. This may be because the solvent was low in viscosity.

In Comparative Example 2, a solvent consisting of chain carbonate (DMC) alone was used. Comparative Example 2 was also low in conductivity. This may be because the solvent was low in dissociative capacity.

In Comparative Example 3, a mixed solvent of cyclic carbonate and chain carbonate was used. A composition of the solvent in Comparative Example 3 has conventionally commonly been used. Comparative Example 3 was higher in conductivity than Comparative Examples 1 and 2. This may be because balance between dissociative capacity and viscosity was improved by mixing of cyclic carbonate and chain carbonate. It is considered that a ratio of mixing in Comparative Example 3 achieved a relative maximum conductivity in the mixed solvent of EC and DMC.

In Example 1, the solvent contained MMF. Example 1 was higher in conductivity than Comparative Examples 1 to 3. It is considered from the results in Example 1 and Comparative Example 3 that MMF alone (Example 1) was better in balance between dissociative capacity and viscosity than the mixed solvent of EC and DMC (Comparative Example 3).

Results in Examples 1 and 2 show a high conductivity at least within a range in which the salt concentration is not lower than 1.1 mol/L and not higher than 1.5 mol/L.

In Example 1 and Comparative Example 2, a degree of dissociation of Li salt was measured. Results are as shown below. MMF is considered as being approximately two times as high as DMC in degree of dissociation.

Example 1: degree of dissociation=0.48
Comparative Example 2: degree of dissociation=0.24

The degree of dissociation above is calculated from equations (I) and (II) below. The equation (II) below is the Nernst-Einstein equation.

$$\text{Degree of dissociation} = \pi/\pi_{NE} \qquad (I)$$

$$\pi_{NE} = (e_0^2 N/kT)(D_{cation} + D_{anion}) \qquad (II)$$

In the equation (I), "$\pi$" represents a conductivity of the electrolyte solution and actually measured with a conductivity meter. "$\pi_{NE}$" represents a conductivity calculated in accordance with the equation (II). In the equation (II), "N" represents an Avogadro's number. "$e_0$" represents elementary charge. "k" represents a Boltzmann constant. "T" represents an absolute temperature. "$D_{cation}$" and "$D_{anion}$" each represent a diffusion coefficient and are actually measured by NMR.

Figure 2:
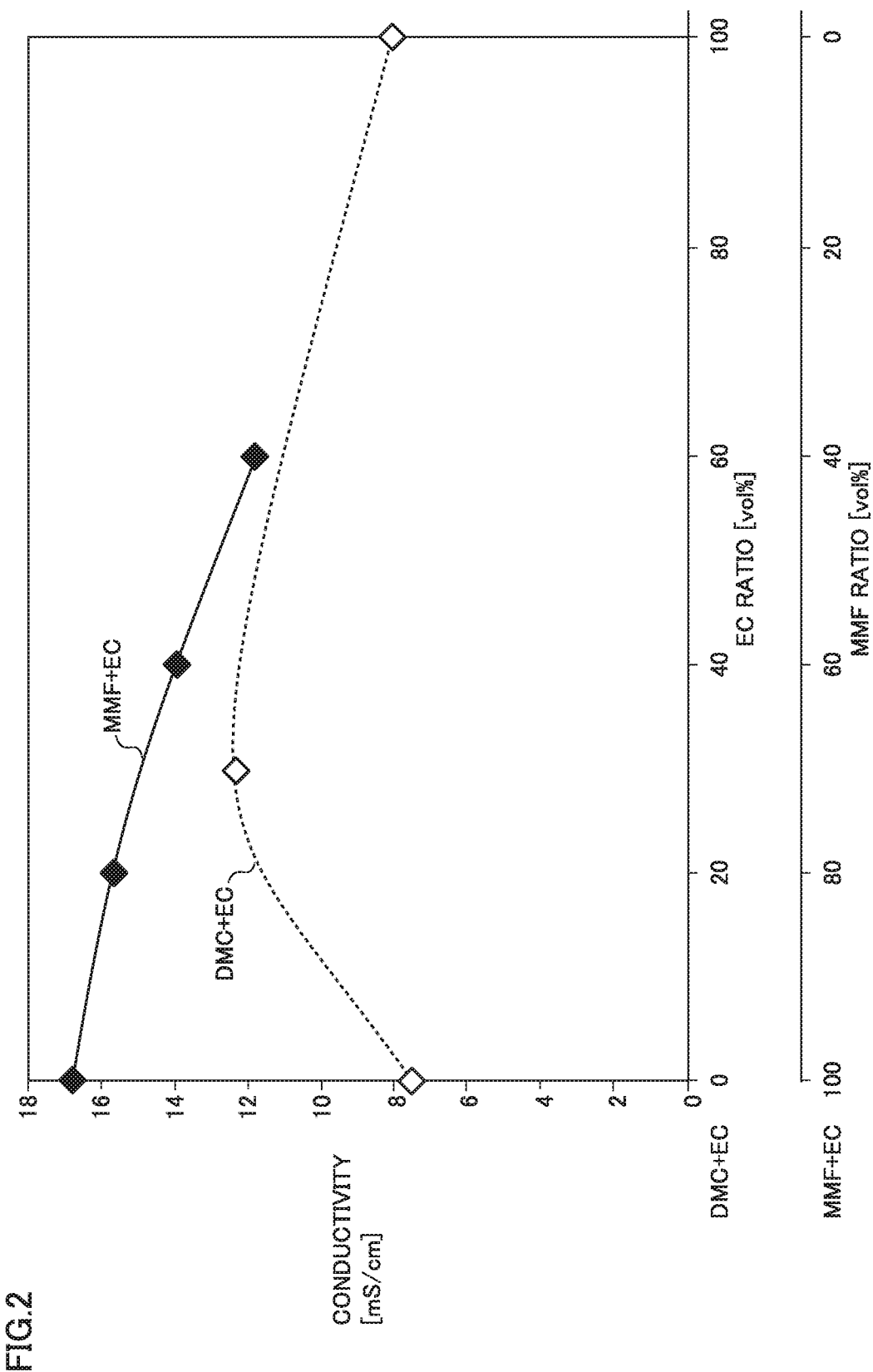
FIG. 2 shows a first graph of relation between a composition of a solvent and a conductivity.

FIG. 2 shows a first graph of relation between a composition of a solvent and a conductivity.

FIG. 2 shows results in Comparative Examples 1 to 3 and Examples 1 and 3 to 5. A mixed solvent of DMC and EC (DMC+EC) is considered to achieve a relative maximum conductivity when a ratio of EC is around 30 vol %.

A mixed solvent of MMF and EC (MMF+EC) exhibits transition different from that of DMC+EC. Namely, MMF+EC achieves an improved conductivity as the ratio of EC is lower. MMF+EC is highest in conductivity when the ratio of EC is 0 vol % (a ratio of MMF is 100 vol %).

Figure 3:
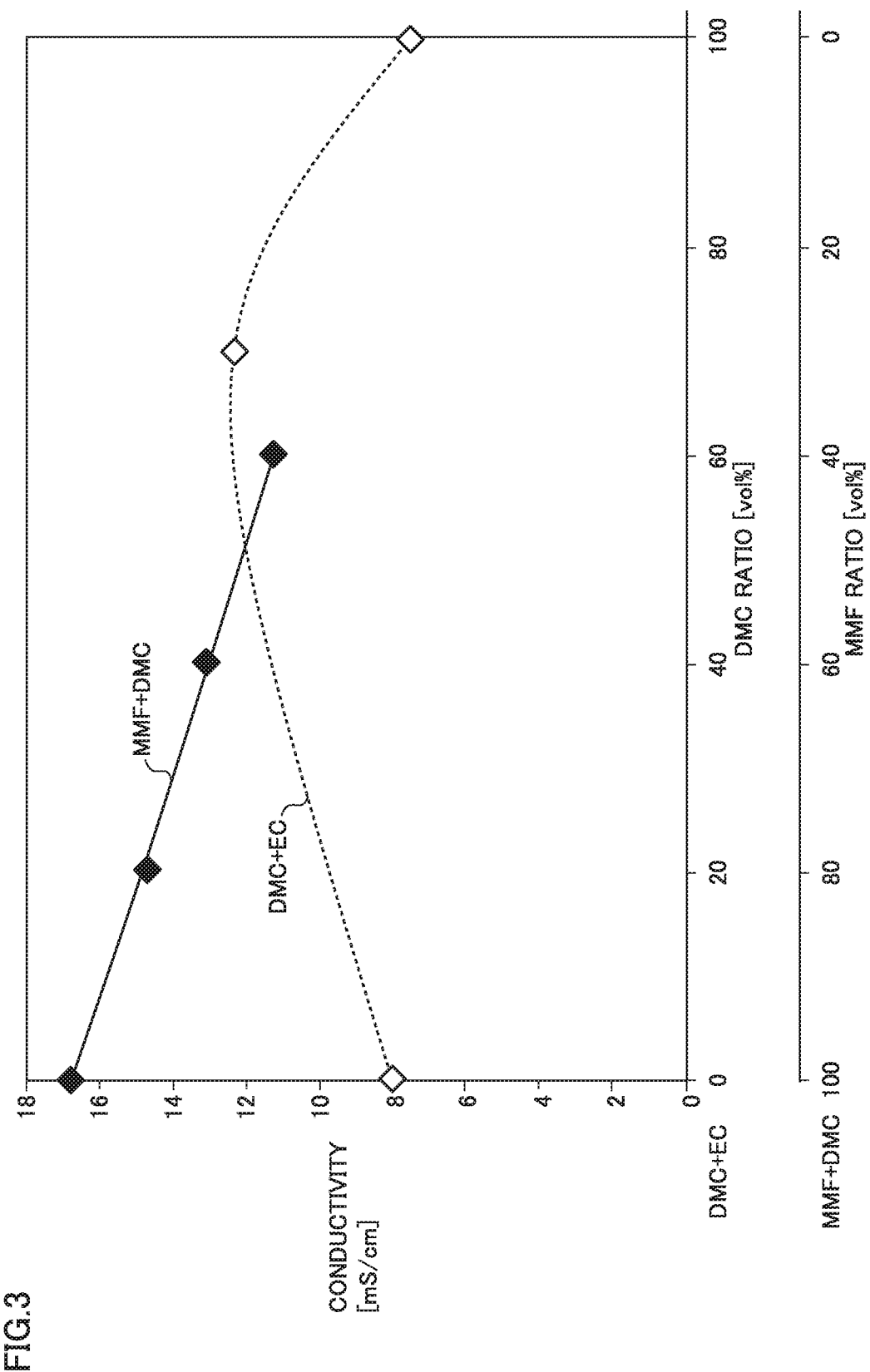
FIG. 3 shows a second graph of relation between a composition of a solvent and a conductivity.

FIG. 3 shows a second graph of relation between a composition of a solvent and a conductivity.

FIG. 3 shows results in Comparative Examples 1 to 3 and Examples 1 and 6 to 8. A mixed solvent of DMC and EC (DMC+EC) is considered to achieve a relative maximum conductivity when a ratio of DMC is around 70 vol %.

A mixed solvent of MMF and DMC (MMF+DMC) exhibits transition different from that of EC+DMC. Namely, MMF+DMC achieves an improved conductivity as the ratio of DMC is lower. MMF+DMC is highest in conductivity when the ratio of DMC is 0 vol % (a ratio of MMF is 100 vol %).

The embodiment and the examples in the present disclosure are illustrative and non-restrictive in every respect. The technical scope defined by the terms of the claims includes any modifications within the scope and meaning equivalent to the terms of the claims.

What is claimed is:

1. An electrolyte solution for a lithium ion battery, the electrolytic solution comprising:
   a solvent; and
   lithium salt,
   the solvent containing at least 40 vol % methoxymethyl formate.

2. The electrolyte solution according to claim 1, wherein the solvent contains at least 60 vol % of methoxymethyl formate.

3. The electrolyte solution according to claim 1, wherein the solvent contains at least 80 vol % of methoxymethyl formate.

4. A lithium ion battery comprising at least the electrolyte solution according to claim 1.

5. The electrolyte solution according to claim 1, wherein the solvent contains at least 60 vol % of methoxymethyl formate and a remainder of the solvent consists of a chain carbonate.

6. The electrolyte solution according to claim 1, wherein the solvent contains at least 60 vol % of methoxymethyl formate and a remainder of the solvent consists of a chain carbonate and a cyclic carbonate.

7. The electrolyte solution according to claim 1, wherein the solvent contains at least 60 vol % of methoxymethyl formate and a remainder of the solvent consists of a cyclic carbonate.

8. The electrolyte solution according to claim 1, wherein the solvent contains at least 80 vol % of methoxymethyl formate and a remainder of the solvent consists of a chain carbonate.

9. The electrolyte solution according to claim 1, wherein the solvent contains at least 80 vol % of methoxymethyl formate and a remainder of the solvent consists of a chain carbonate and a cyclic carbonate.

10. The electrolyte solution according to claim 1, wherein the solvent contains at least 80 vol % of methoxymethyl formate and a remainder of the solvent consists of a cyclic carbonate.

11. The electrolyte solution according to claim 1, wherein a remainder of the solvent consists of a chain carbonate.

12. The electrolyte solution according to claim 1, wherein a remainder of the solvent consists of a chain carbonate and a cyclic carbonate.

13. The electrolyte solution according to claim 1, wherein a remainder of the solvent consists of a cyclic carbonate.

* * * * *